Sept. 14, 1965 G. LEMESLE ETAL 3,206,374
BELT RESTRAINT SYSTEM FOR MODERATOR-REFLECTOR
STRUCTURE OF A NUCLEAR REACTOR
Filed Nov. 5, 1958 3 Sheets-Sheet 1

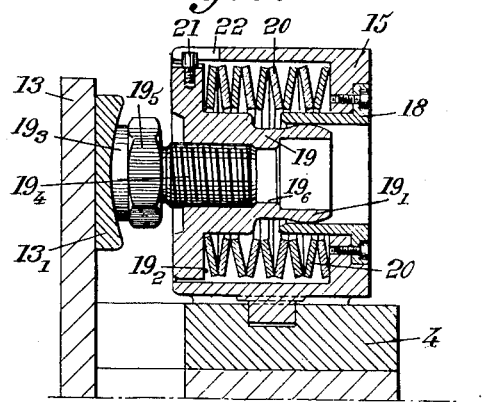
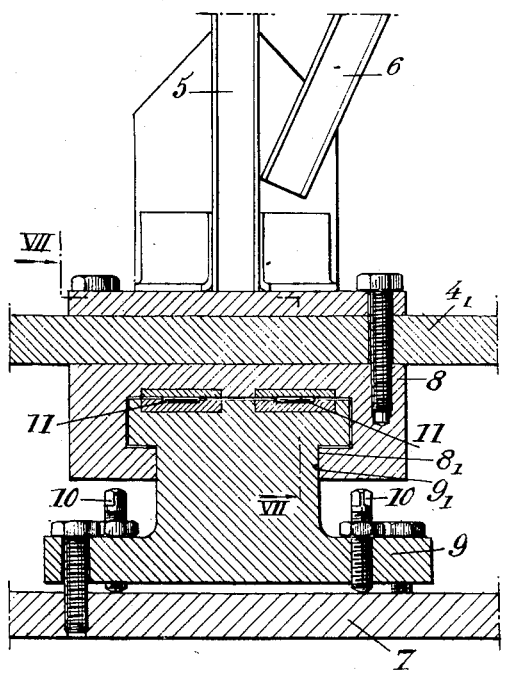
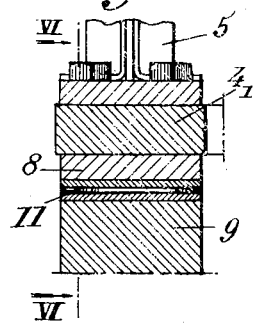

United States Patent Office 3,206,374
Patented Sept. 14, 1965

3,206,374
BELT RESTRAINT SYSTEM FOR MODERATOR-REFLECTOR STRUCTURE OF A NUCLEAR REACTOR
Georges Lemesle and Roland Roche, Paris, and Pierre Rougé, Gif-sur-Yvette, France, assignors to Commissariat a l'Energie Atomique, Paris, Seine, France, a state administration of France
Filed Nov. 5, 1958, Ser. No. 772,040
Claims priority, application France, Nov. 8, 1957, 751,190
4 Claims. (Cl. 176—85)

The present invention relates to nuclear reactors including moderator and reflector elements piled upon one another to form vertical body sections which are juxtaposed together to constitute a structure forming the active body of the reactor.

The chief object of this invention is to improve the stability of such structures without having to impose supplementary stresses upon the casings which surround said structures and which already have to withstand the pressure of the coolant in the reactor.

The structure above referred to, in which the moderator elements are for instance constituted by graphite, are provided with channels in which is housed the fissionable material and through which the coolant circulates.

Due to the deformations caused by temperature variations and by irradiation of the material (Wigner effect), the elements of the structure cannot be rigidly interconnected and, as a rule, some interval is left between said elements so as to reduce the total "swelling" of the structure.

As a consequence of this, and in view of the weight and the dimensions of the structures in question (the weight being of the order of magnitude of one thousand tons and the dimensions of ten meters) the problem of obtaining a good stability of such structures is very delicate.

According to the present invention, the whole of the moderator and reflector elements forming a reactor body having the general shape of a cylinder with vertical generatices, the periphery of said body being constituted by the reflector elements, and the moderator elements being disposed inside the space limited by said reflector elements, stability of the whole is obtained by making use of a framework carried by said support base and constituting a cage of a cylindrical shape corresponding to that of said reactor body and surrounding it at a small distance therefrom, said cage, which is provided with inwardly extending resilient means bearing against at least some of said reflector elements, being capable of absorbing by itself all possible outward forces exerted by said elements.

A preferred embodiment of the present invention will be hereinafter described with reference to the accompanying drawings, given merely by way of example and in which:

FIG. 1 is a diagrammatic perspective view of a framework as above referred to.

FIG. 5 shows, on a still enlarged scale, resilient means carried by the framework, FIG. 5 being a vertical axial section on the line V—V of FIG. 4.

FIGS. 6 and 7 are respectively a tangential vertical section of the line VI—VI of FIG. 7 and a radial vertical section on the line VIII—VIII of FIG. 6, showing the means for fixing the framework on the uspport base of the reactor.

Figure 1:
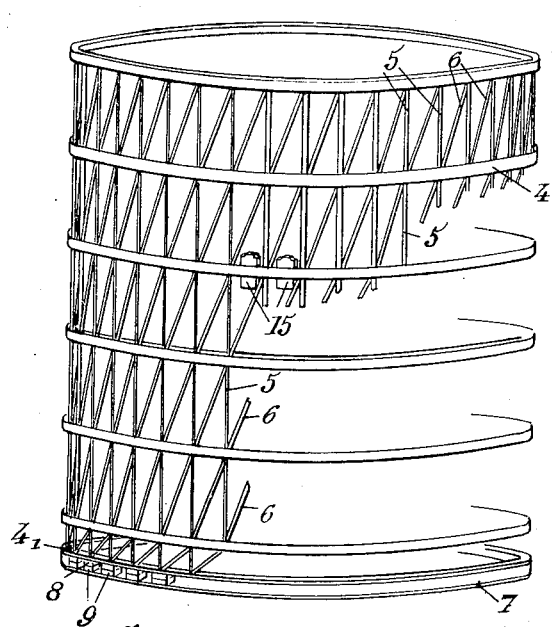

In the reactor shown by the drawings, the channels are vertical and the body of the reactor is constituted by layers of upright prismatic bars 1 (FIG. 1) juxtaposed without being in contact with one another, each layer being separated from that located above (or below) it by two superposed layers 2 and 3 of blocks which are cut and disposed in such manner that:

Each block is rigidly connected in the horizontal direction with the bar adjacent thereto (located either above it or under it), And the blocks of each layer can be juxtaposed in contact with one another only in one horizontal direction which is preferably that for which their Wigner deformations are minimum, the horizontal directions which correspond respectively to the two layers being at right angles to each other.

A more complete description of such an arrangement of block layers is given in the U.S. patent application Ser. No. 768,665 filed October 21, 1958.

The means for maintaining the structure constituted by the juxtaposition of superimposed moderator and reflector elements includes a metallic framework carrying means for resiliently exerting on the body constituted by the reflector and moderator elements centripetal forces at the level of every pair of block layers.

Figure 3:
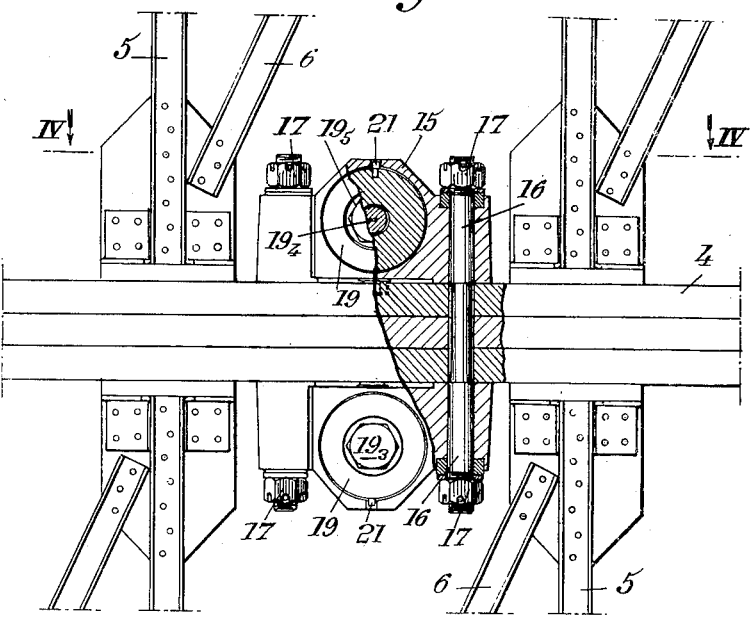
FIGS. 3 and 4 show, on an enlarged space, respectively in elevational view and in horizontal section on the line IV—IV of FIG. 3, a portion of the same system.

The framework is constituted by horizontal circular belts 4 each disposed at the level of the plane of contact of two layers 2 and 3, said belts 4 being braced in the vertical direction by bracing members 5 which support practically the whole of the weight of the framework and of the resilient tightening means it carries and by oblique bracing members 6 (FIGS. 1 and 3) which give the whole good resistance to twisting and bending stresses.

These members 4, 5 and 6 are made of a metal such as nickel steel designated commercially by the reference ADR as sold by the Imphy Steelworks, the coefficient of expansion of this steel being close to that of graphite at least within the range of temperatures corresponding to the operation of the reactor (from 0 to 300° C.). It is thus possible to reduce to a minimum the drawbacks due to differences between thermal expansion of the framework and of the structure of moderator and reflector elements.

The cross sections of belts 4 go increasing from the top toward the bottom of the framework. Of course, these cross sections must be sufficient to enable the belts to support the whole of the efforts applied thereto through the resilient means they carry and which will be hereinafter described, whether these efforts are due exclusively to normal deformations of the moderator and reflector elements during the operation of the reactor or to other causes such as a slight inclination of at least a part of the reactor body with respect to the vertical.

The lower belt $4_1$ (FIGS. 6 and 7) of framework rests upon the support base 7 of the reactor through means which permit radial deformations of said last mentioned belt. These means essentially include a plurality of pairs of sliding members, 8 and 9, every member 8 being rigid with belt $4_1$ and the other member 9 with the support base 7 in a slightly adjustable manner by means of screw abutments 10. The upper member 8 of every pair is mounted slidable in a radial horizontal direction with respect to the lower member 9. Members 8 and 9 have vertical walls $8_1$ and $9_1$ which cooperate together to prevent any displacements of belt $4_1$ other than radial displacements. Advantageously, needle bearings 11 are interposed between the horizontal surfaces of the two members so as to facilitate said radial relative displacements.

Figure 2:
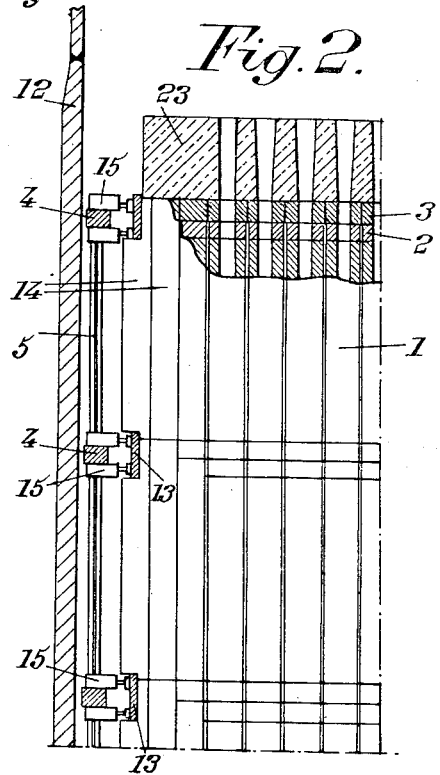
FIG. 2 shows a portion of this framework and a portion of the reactor body, in section along a diametral plane.
Figure 4:
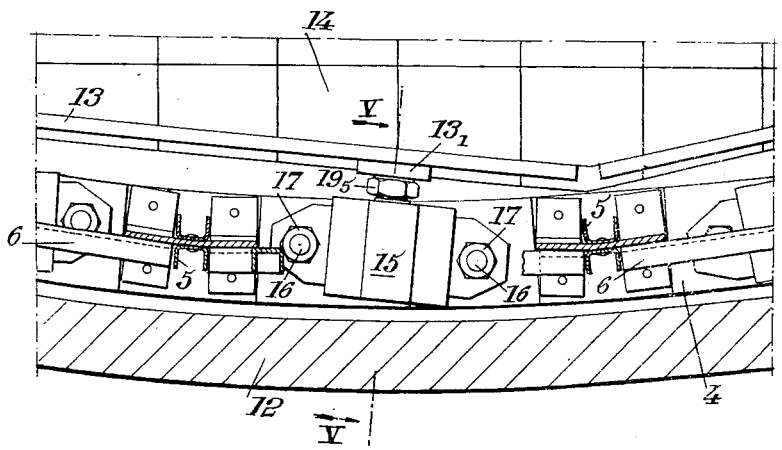

The framework has a general cylindrical shape having vertical generatrices and it is housed between the structure constituted by the moderator and reflector elements and the casing 12 (FIGS. 2 and 4) which is to withstand the pressure of the coolant in the reactor.

The parts of the framework are dimensioned in such manner that the maximum amplitude of the deformations thereof cannot exceed some millimeters so that the framework can never come into contact with the inner wall of casing 12.

The resilient means above referred to are constituted by pairs of spring-blocks fixed on belts 4, one above the corresponding belt and the other below it, each of these spring-blocks being capable of exerting a centripetal pressure upon one of the layers 2 and 3 through the intermediate of a distributing plate 13 and of the peripheral reflector elements 14.

Every spring-block comprises a casing 15 (FIGS. 3, 4, 5) fixed upon a belt 4 by means of two threaded rods 16 and of nuts 17. Casing 15 forms a cylindrical housing 18 having a substantially horizontal axis in which can slide the ball-shaped portion $19_1$ of an abutment member 19, this ball-shaped portion $19_1$ being adapted to fit in said housing 18. A compression spring 20 constituted by a plurality of Belleville springs is interposed between the end of casing 15 and a shoulder $19_2$ of the abutment member 19. The end of abutment member 19 opposed to the ball-shaped portion $19_1$ thereof is in the form of a spherical bearing $19_3$ adapted to cooperate with a corresponding spherical bearing $13_1$ rigid with the distributing plate 13. The abutment member 19 is made of two pieces screwed in each other so as to permit of adjusting the total length thereof and consequently the force of spring 20. For this purpose, the spherical bearing $19_3$ is formed in a rod $19_4$ provided with external screw threads and which can be screwed at will, for instance by means of a nut-shaped portion $19_5$ rigid therewith, in a threaded hole $19_6$ provided in the piece which forms the ball-shaped portion $19_1$ and which carries the shoulder $19_2$. A screw 21 carried by member 19 and engaged in a slot 22 provided in casing 15 prevents rotation of said member 19 with respect to said casing.

The spherical bearings and the ball-shaped portions of abutment member 19 enable said member to be slightly inclined with respect to the horizontal radial direction, which facilitates the absorption of the differential expansion which may take place between the framework and the moderator and reflector body.

The use of springs of the Belleville type permits of substantially reducing the radial dimensions of the resilient holding means. It is therefore possible to place them in the small space available between the moderator and reflector structure and the outer casing of the reactor, so that the diameter of this casing and therefore the cost of the reactor are reduced to a minimum.

In order to avoid a warping of the upper layers such as 3 under the effect of centripetal forces, cast iron plates such as 23 (FIG. 2) are placed on the structure, each of said plate covering possibly several graphite columns.

The system according to this invention has many advantages and in particular the following ones:

The framework and the resilient means it carries are easy to mount;

The stresses due to deformations of the moderator and reflector structure are wholly absorbed in a resilient fashion without transmitting said stresses to the outer casing of the reactor;

The risks of injury due to a deterioration of one of the resilient members are eliminated since the local stresses that result from such a braking would be absorbed by the whole of the framework.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. In combination, a nuclear reactor structure comprising a moderator and reflector, a support base on which said structure is resting, and a restraint system for said structure which comprises, a plurality of horizontal belts surrounding said structure at different levels respectively, bracing members extending between said belts and fixed thereto and forming therewith an open-meshed cylindrical cage, supported exclusively by said base, resilient connecting means tightly held in compression between each of said belts and the portion of said structure located at the same level as it, and supporting means supporting the lowermost of said horizontal belts on said supporting base for slight radial deformation of said belt and said cage with respect to said support base.

2. A combination according to claim 1 in which each of said resilient means includes a sleeve fixed on one of said belts, an abutment unit guided in an approximately radial and horizontal direction in said sleeve, a plate applied against the outer surfaces of the periphery of said moderator and reflector structure, said abutment unit being mounted in swivelling fashion with respect both to said plate and to said sleeve, and spring means inserted between said sleeve and said abutment unit for urging said abutment unit in the inward direction.

3. A combination according to claim 2 in which said spring means are constituted by a juxtaposition of Belleville springs.

4. A combination according to claim 2 in which said abutment unit is of adjustable length.

References Cited by the Examiner

UNITED STATES PATENTS 2,863,815 12/58 Moore _____ 176—29
2,865,828 12/58 Long et al. _____ 176—41
2,998,370 8/61 Gaunt _____ 176—85

FOREIGN PATENTS 785,928 11/57 Great Britain.

CARL D. QUARFIRTH, *Primary Examiner.*

LEON D. ROSDOL, ROGER L. CAMPBELL, OSCAR R. VERTIZ, *Examiners.*